US005883362A

United States Patent [19]

Pettibone et al.

[11] Patent Number: 5,883,362

[45] Date of Patent: Mar. 16, 1999

[54] APPARATUS AND METHOD FOR REGULATING COOKING TIME IN A LIGHTWAVE OVEN

[75] Inventors: Donald W. Pettibone, Cupertino; John W. O'Neal, Burlingame; Gay L. Winterringer, Menlo Park, all of Calif.

[73] Assignee: Quadlux, Inc., Fremont, Calif.

[21] Appl. No.: 519,050

[22] Filed: Aug. 24, 1995

Related U.S. Application Data

[63] Continuation-in-part of Ser. No. 39,621, Mar. 30, 1993, abandoned, which is a continuation of Ser. No. 65,878, May 21, 1993, abandoned, which is a continuation-in-part of Ser. No. 738,207, Jul. 30, 1991, abandoned, which is a continuation-in-part of Ser. No. 350,024, May 12, 1989, Pat. No. 5,036,179, which is a continuation-in-part of Ser. No. 195,967, May 19, 1988, abandoned.

[51] Int. Cl.[6] ................................ H05B 1/02; A21B 1/40

[52] U.S. Cl. .......................... 219/411; 219/413; 219/486; 219/494; 99/333

[58] Field of Search .................................... 219/391, 395, 219/398, 388, 405, 411, 413, 486, 492, 494; 392/416; 99/333; 426/241, 243

[56] References Cited

U.S. PATENT DOCUMENTS

| | | | |
|---|---|---|---|
| 2,549,619 | 4/1951 | Miskella | 219/411 |
| 2,559,249 | 7/1951 | Hudson | 219/35 |

(List continued on next page.)

FOREIGN PATENT DOCUMENTS

| | | |
|---|---|---|
| 0 023 724 | 2/1981 | European Pat. Off. . |
| 0215617 | 9/1986 | European Pat. Off. . |
| WO 95 12962 | 5/1995 | European Pat. Off. . |
| 25 46 106 | 4/1977 | Germany . |
| 3503648 | 4/1986 | Germany . |
| 57-60007 | 4/1982 | Japan . |
| 57-70323 | 4/1982 | Japan . |
| 59-210228 | 11/1984 | Japan . |
| 60-37116 | 2/1985 | Japan . |
| 60-69920 | 5/1985 | Japan . |
| 60-167932 | 11/1985 | Japan . |
| 60-245933 | 12/1985 | Japan . |
| 63-34913 | 3/1988 | Japan . |
| 63-49405 | 4/1988 | Japan . |
| 1-154483 | 6/1989 | Japan . |
| 315982 | 12/1989 | Japan . |
| 4080523 | 3/1992 | Japan . |
| 361714 | 12/1992 | Japan . |
| 59-47302 | 3/1994 | Japan . |
| 569419 | 11/1975 | Switzerland . |
| 1215651 | 3/1986 | U.S.S.R. . |
| 839551 | 6/1960 | United Kingdom . |
| 1273023 | 5/1972 | United Kingdom . |
| 2132060 | 8/1983 | United Kingdom . |
| 1273023 | 6/1984 | United Kingdom . |
| 2152790 | 8/1985 | United Kingdom . |
| 2245136 | 1/1992 | United Kingdom . |

OTHER PUBLICATIONS

Fostoria Corp., "Heat Processing with Infrared," Feb. 1962, pp. 1–7.

Summer, W. Dr., "Ultra–Violet and Infra–Red Engineering," 1962, pp. 102–112.

Beggs, E.W., "Quicker Drying With Lamps," Jul. 1939, vol. 97, No. 7, pp. 88–89.

Harold McGee, Book, "On Food and Cooking," Charles Schribner's Sons, New York, 1984, Chapter 14, pp. 608–624.

*Primary Examiner*—Teresa J. Walberg
*Assistant Examiner*—J. Pelham
*Attorney, Agent, or Firm*—Limach & Limbach LLP

[57] ABSTRACT

A lightwave cooking oven method and apparatus are disclosed wherein a thermistor determines an elevation temperature at a given location on the oven where oven secondary heating has a relation to the cooking time of the food and periodically reducing the power to lamps substantially midway during the normal cooking time at the beginning of which the elevated temperature was determined for a given recipe. The power can be reduced by being turned off or lowered.

32 Claims, 14 Drawing Sheets

U.S. PATENT DOCUMENTS

| | | | |
|---|---|---|---|
| 2,864,932 | 12/1958 | Forrer | 219/35 |
| 3,033,968 | 5/1962 | Julie | 219/492 |
| 3,037,443 | 6/1962 | Newkirk et al. | 99/332 |
| 3,249,741 | 5/1966 | Mills | 219/388 |
| 3,304,406 | 2/1967 | King | 219/411 |
| 3,313,917 | 4/1967 | Ditzler et al. | 219/400 |
| 3,326,692 | 6/1967 | Martino et al. | 99/328 |
| 3,342,977 | 9/1967 | Anderson | 219/548 |
| 3,448,678 | 6/1969 | Burnstein | 99/386 |
| 3,470,942 | 10/1969 | Fukada et al. | 219/492 |
| 3,569,656 | 3/1971 | White et al. | 219/10.55 B |
| 3,621,200 | 11/1971 | Watts, Jr. | 219/377 |
| 3,666,921 | 5/1972 | Shevlin | 219/492 |
| 3,688,084 | 8/1972 | Charneski | 219/537 |
| 3,828,163 | 8/1974 | Amagami et al. | 219/413 |
| 3,870,806 | 3/1975 | Capossela et al. | 426/221 |
| 3,935,807 | 2/1976 | Main et al. | 99/352 |
| 4,164,591 | 8/1979 | Ahlgren et al. | 426/523 |
| 4,238,669 | 12/1980 | Huntley | 219/405 |
| 4,238,995 | 12/1980 | Polster | 219/411 |
| 4,244,284 | 1/1981 | Flavan, Jr. et al. | 99/327 |
| 4,245,148 | 1/1981 | Gisske et al. | 219/492 |
| 4,360,726 | 11/1982 | Haden | 219/494 |
| 4,379,964 | 4/1983 | Kanazawa et al. | 219/492 |
| 4,396,817 | 8/1983 | Eck et al. | 426/523 |
| 4,401,884 | 8/1983 | Kusunoki et al. | 426/243 |
| 4,410,779 | 10/1983 | Weiss | 219/10.55 B |
| 4,421,974 | 12/1983 | Oota et al. | 219/492 |
| 4,441,015 | 4/1984 | Eichelberger et al. | 219/411 |
| 4,463,238 | 7/1984 | Tanabe | 219/10.55 B |
| 4,481,405 | 11/1984 | Malick | 219/405 |
| 4,483,631 | 11/1984 | Kydd | 364/557 |
| 4,486,639 | 12/1984 | Mittelsteadt | 219/10.55 B |
| 4,516,486 | 5/1985 | Burkhart | 99/388 |
| 4,554,437 | 11/1985 | Wagner et al. | 219/388 |
| 4,565,704 | 1/1986 | Dagerskog et al. | 426/233 |
| 4,575,616 | 3/1986 | Bergendal | 219/405 |
| 4,601,004 | 7/1986 | Holt et al. | 99/328 |
| 4,687,895 | 8/1987 | Chitre et al. | 219/10.55 B |
| 4,692,597 | 9/1987 | Tsuda et al. | 219/492 |
| 4,700,051 | 10/1987 | Goessler et al. | 219/464 |
| 4,731,251 | 3/1988 | Jovanovic | 426/243 |
| 4,761,529 | 8/1988 | Tsisios | 219/10.55 B |
| 4,771,154 | 9/1988 | Bell et al. | 219/405 |
| 4,894,518 | 1/1990 | Ishikawa | 219/413 |
| 4,960,977 | 10/1990 | Alden | 219/411 |
| 5,034,235 | 7/1991 | Dunn et al. | 426/238 |
| 5,036,179 | 7/1991 | Westerberg | 219/411 |
| 5,039,535 | 8/1991 | Lang et al. | 99/333 |
| 5,164,161 | 11/1992 | Feathers et al. | 422/109 |
| 5,171,974 | 12/1992 | Koether et al. | 219/506 |
| 5,179,265 | 1/1993 | Sheridan et al. . | |
| 5,182,439 | 1/1993 | Burkette et al. | 219/492 |
| 5,308,161 | 5/1994 | Stein . | |
| 5,315,092 | 5/1994 | Takahashi et al. . | |
| 5,317,130 | 5/1994 | Burkett et al. | 219/492 |
| 5,319,171 | 6/1994 | Tazawa | 219/705 |
| 5,352,865 | 10/1994 | Burkett et al. | 219/492 |
| 5,378,872 | 1/1995 | Jovanovic | 219/405 |
| 5,382,441 | 1/1995 | LEntz et al. | 436/411 |
| 5,478,986 | 12/1995 | Westerberg | 219/411 |
| 5,517,005 | 5/1996 | Westerberg | 219/405 |
| 5,567,459 | 10/1996 | Gonzalez-Hernandez et al. | 426/241 |
| 5,665,259 | 9/1997 | Westerberg | 219/411 |
| 5,695,669 | 12/1997 | Westerberg | 219/411 |
| 5,712,464 | 1/1998 | Westerberg | 219/411 |

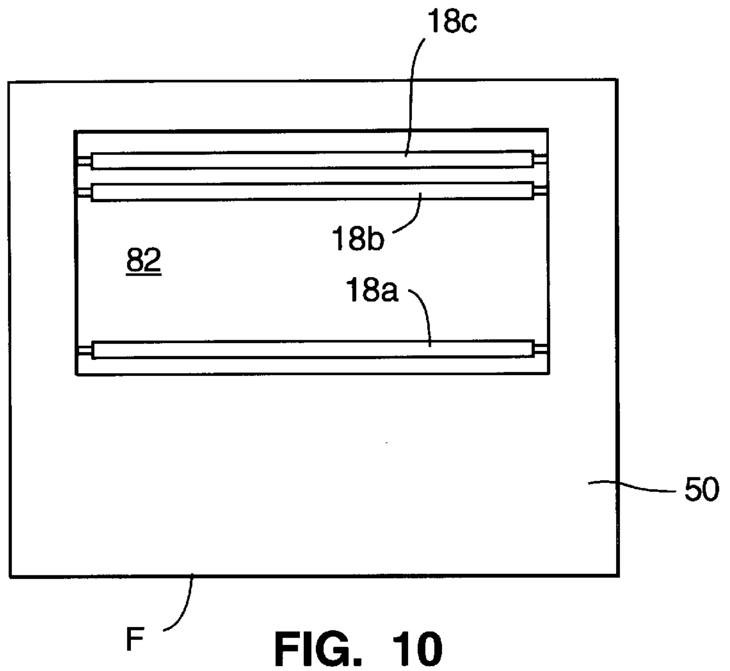
FIG. 10
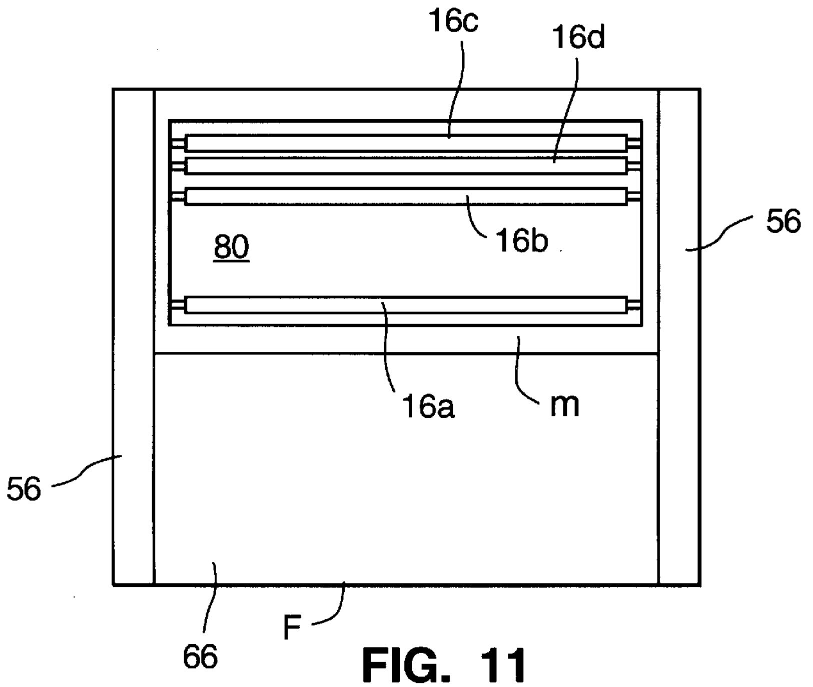
FIG. 11
FIG. 12
RECIPE 1
BROWNING LEVEL (1-5)
1=LIGHTER...5=DARKER
3

APPARATUS AND METHOD FOR REGULATING COOKING TIME IN A LIGHTWAVE OVEN

RELATED APPLICATIONS

This application is a continuation-in-part of application Ser. No. 08/039,621, filed Mar. 30, 1993, now abandoned, which is a continuation of application Ser. No. 08/065,878, filed May 21, 1993, now abandoned which was a continuation-in-part of application Ser. No. 07/738,207, filed Jul. 30, 1991, now abandoned, which was a continuation-in-part of application Ser. No. 07/350,024, filed May 12, 1989, now U.S. Pat. No. 5,036,179 which was in turn a continuation-in-part of application Ser. No. 07/195,967, filed May 19, 1988, now abandoned.

FIELD OF THE INVENTION

This invention relates to the field of lightwave or radiant source ovens. More particularly, this invention relates to ovens which are capable of adjusting oven lamp intensity and cooking time based upon the measured temperature in the oven at a given time.

BACKGROUND OF THE INVENTION

Lightwave ovens having linear sources of visible and infra-red radiant energy are disclosed and described in U.S. Pat. No. 5,036,179, which is incorporated herein by reference. These ovens provide high-speed, high-quality cooking and baking of food items by impinging high-intensity visible, near-visible, and infrared radiations onto a food item. Lightwave ovens cook the food items within the short periods of time normally found in microwave cooking while maintaining the browning of infrared cooking and the quality of conduction-convection cooking. When food is exposed to a sufficiently intense source of visible, near-visible, and infrared radiation, the food absorbs low levels of visible and near-visible radiation, thereby allowing the energy to penetrate the foodstuff and heat it deeply. The longer infrared radiation does not penetrate deeply but acts as an effective browning agent.

Ordinarily, the source of the visible, near-visible and infrared radiation is one or more quartz-halogen tungsten lamps, or equivalent means such as quartz arc lamps. Typical quartz-halogen lamps of this type convert electrical energy into black body radiation having a range of wavelengths from 0.4 $\mu$m to 4.5 $\mu$m with a peak intensity at approximately 1 $\mu$m at an operating temperature of approximately 2898° K. and a significant portion of the energy, approximately 10.6% in the visible light spectrum 0.39 to 0.77 $\mu$m and approximately 7% in the visible light spectrum of 0.4 to 0.7 $\mu$m. In the preferred embodiment, the lamps operate at 3000 degrees Kelvin and convert electrical energy into black body radiation having a range of wavelengths from 0.4 $\mu$m to 4.5 $\mu$m with a peak intensity at 0.965 $\mu$m producing approximately 12% of the radiant energy in the visible range 0.39 to 0.77 $\mu$m or approximately 8.1% in the visible light spectrum of 0.4 to 0.7 $\mu$m of the electromagnetic spectrum. Each lamp can generally provide up to 1.5 to 2 KW of radiant energy with a significant portion of the energy in the visible light spectrum.

The ovens can use a plurality of these lamps or an array of several lamps either operated in unison or selectively operated in varying combinations as necessary for the particular food item sought to be cooked. These radiation sources are ordinarily positioned above and below the food item. The walls of the surrounding food chamber are preferably made from highly reflective surfaces. The visible and infrared waves from the radiation sources impinge directly on the food item and are also reflected off the reflective surfaces and onto the food item from many angles. This reflecting action improves uniformity of cooking.

Ovens of this type preferably include a microprocessor into which cooking times for a variety of dishes and food types may be entered. This allows the user to select the cooking time for a specific dish using controls located on the front panel of the oven. Selecting the cooking program for a specific dish will illuminate the lamps for the cooking time required to cook the specific dish.

Conventional thermal ovens cook food by transferring energy to the food and heating it by a combination of radiation and conduction and convection through the air. It is well known that virtually all conventional thermal ovens require a "preheat" time during which the temperature inside the oven is raised to the desired cooking temperature. During preheating, the air and oven walls inside the oven accumulate and store heat energy. Thus the amount of heat that must be supplied to the oven is reduced during the cooking cycle.

The cooking function in a lightwave oven is not primarily performed by the same means used in a thermal oven. Cooking is instead accomplished by the interaction of the visible light and infrared radiation with the food. In a normal cooking cycle, the food is positioned inside a room-temperature oven. The radiation sources, or lamps, are then illuminated for the duration of the cooking cycle, termed the "normal cooking time", and are immediately turned off at the end of the cooking cycle. If several separate food items are to be cooked, the process is repeated for each food item; the lamps do not remain illuminated between the cooking cycles.

Food items in lightwave ovens are cooked for predetermined periods of time, and cooking times are calculated under the assumption that ovens are initially at room temperature and are programmed into the ovens for various different food items. If several items of food are cooked in sequence, heated air accumulates in the oven and all components of the oven cavity heat up through a combination of thermal radiation and convection and conduction so that heat is transferred to the food over and above what is transferred via the lamps. This source of heating will be termed "oven secondary heating". With each consecutive cooking cycle the required cooking time thus decreases due to the accumulation of heat energy within the oven.

When the cooking cycle is timed using a radiant source oven that is initially at room temperature, the oven normally cooks a 9 inch diameter pizza in 65 seconds. If several pizzas are cooked in rapid sequence, the cooking time decreases to 45 seconds after 2 or 3 pizzas are cooked. If heat accumulation within the oven is not factored into the cooking cycle, the oven will produce pizzas that are burned.

Because the oven's internal parts become heated during cooking, evacuation of heated air cannot fully compensate for the problem of increased oven temperature. A solution is needed whereby adjustment is made for added oven energy and to compensate for an increased oven temperature.

SUMMARY OF THE INVENTION

The present invention utilizes a thermistor positioned in a radiant source oven in a particular location. A microprocessor receives a signal representing thermistor measurements and adjusts the cooking operation to compensate for the added cooking effect due to oven secondary heating.

In accordance with the preferred embodiment of the present invention, method and apparatus are provided for determining the reduction of the total lamp on time for a given recipe for cooking a given food by a time amount related to the determined temperature elevation of the thermistor and periodically reducing the power to the radiation sources or lamps during the normal cooking time for that recipe with a total time of the periods of reduced power, termed the "total off time", producing a reduction of the energy provided to the food in an amount substantially equivalent to the amount of energy provided to the food by the oven secondary heating. Preferably, the power reduction is achieved by turning the lamps off although under another feature of the invention, the power to the lamps could be reduced without turning the lamps off or the intensity of the lamps could be similarly reduced.

In accordance with another aspect of the preferred embodiment of the present invention, the periodic reduction of power to the lamps is performed substantially mid-way during the length of the normal cooking time. Thus, the power to the lamps is turned off for a first period of time, termed the "cycle off time", before the end of the cooking cycle such as 4 seconds and after the lamp has been in full power for a second period of time, termed the "cycle on time", such as 3 seconds.

In accordance with still another aspect of the present invention, the total off time of power is adjusted to be longer or shorter based upon the nature of the food being cooked.

In accordance with still another aspect of the present invention, the total off time for either the upper or lower banks of lamps is adjusted depending upon whether there is more or less heat coupled into the top or bottom surface of the food due to oven secondary heating. If, for example, more heat is coupled into the food through the bottom of the food than through the top due to oven secondary heating, then the lower lamps would have the time of reduced power lengthened relative to the time of reduced power for the top lamps. These times, which are the sum of the off times for the top and bottom lamps, will be termed the "top total off time" and the "bottom total off time", respectively.

In accordance with another aspect of the invention, an evacuator removes a portion of the heated air from the oven to partially decrease the temperature of the oven interior.

DESCRIPTION OF THE DRAWINGS

FIG. 10 is a cross-sectional view of the lightwave oven as shown in FIG. 1 taken along line 10—10 showing the bottom wall of the oven cavity.

FIG. 11 is a cross-sectional view of the lightwave oven as shown in FIG. 1 taken along line 11—11 and showing the upper wall of the oven cavity.

FIG. 12 is a front view of a control button on the panel of the oven in FIG. 7 illustrating operation of the level control to compensate for different types of foods.

DETAILED DESCRIPTION OF THE INVENTION

Figure 1A:
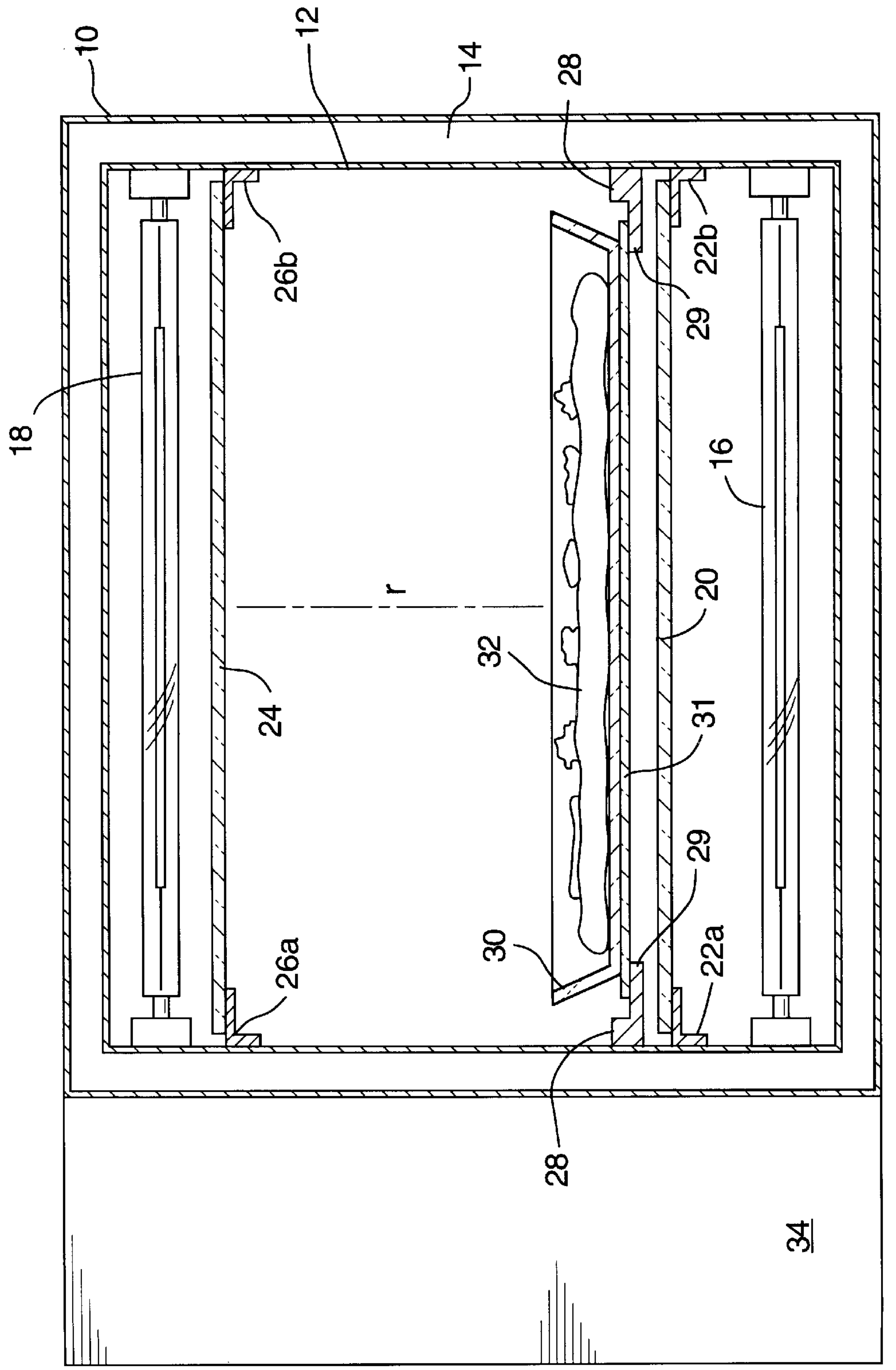
FIG. 1A is a front section view of a lightwave oven.

The present invention is comprised generally of an oven 10, upper and lower radiant energy sources, or lamps 18, 16, a thermistor 42, a microprocessor 44, and an evacuation tube 46.

FIG. 1A is a front section view of a radiant source oven of the type for which the present invention is designed. The energy for cooking is supplied by lower heating lamps 16 and upper radiation heating lamps 18. The lamps are preferably quartz-halogen tungsten lamps which are capable of producing approximately 2 kW of radiant power for a total radiant power of at least 4 kW, and with a significant portion of the light energy in the visible and near visible light spectrum. This water which is the major constituent of most foodstuffs is essentially transparent for wavelengths of electromagnetic radiation less than about 1.35 $\mu$m. This region of low energy absorption in water includes the visible (0.39 to 0.77 $\mu$m) and the short infrared (0.77 to 1.35 $\mu$m) which we term "near visible". The oven according to the preferred embodiment cooks with approximately 12% of the radiant energy in the visible light range of the electromagnetic spectrum, or with approximately 40% to 50% of the energy in the visible and near visible light ranges of the spectrum. When illuminated, the lighted portion of a preferred lamp has a length of approximately 10 inches.

The inner surface of the inner wall 12 is preferably a highly polished metal, such as aluminum, which is very reflective to the wide spectrum of wavelengths from the radiant lamps. The oven has a door which also has a reflective inner surface. These reflective surfaces improve uniformity of cooking by reflecting light energy from the lamps onto the food surface. Reflection may be further enhanced by positioning the lamps in upper and lower reflector assemblies 60*a*, 60*b* (FIG. 1C).

Two radiation transparent plates 20 and 24 are used to isolate the cooking chamber from the radiant lamps, making the oven easier to clean. These plates can be formed from materials, such as high quality heat-resistant glasses or ceramics that are transparent to visible, near visible and infrared radiations. The lower transparent plate 20 is supported by brackets 22*a* and 22*b* and is positioned above the lower lamps 16. The upper transparent plate 24 is supported by brackets 26*a* and 26*b* and is positioned below upper lamps 18.

Shelf 28 is mounted between the transparent plates inside the oven chamber. As shown in FIG. 1C, the shelf 28 has a circular cut out portion 27 which is designed to support a circular rack (not shown) having a grid of small diameter metallic bars. The food item, or a heat-resistant glass or ceramic dish which holds the food, rests on top of the rack during cooking. The rack has a diameter of preferably 12 to 16 inches and is capable of rotating around an axis of rotation, designated r in FIG. 1A.

Figure 1B:
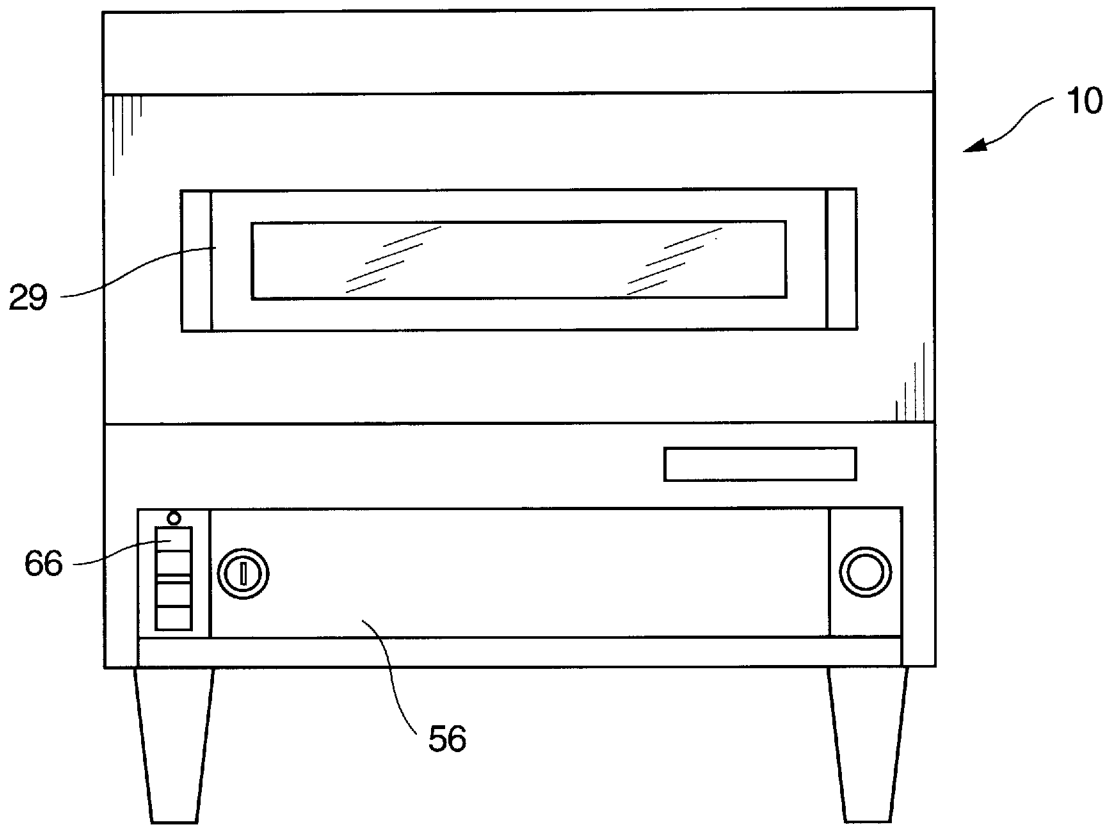
FIG. 1B is a front elevation view of a lightwave oven.
Figure 1C:
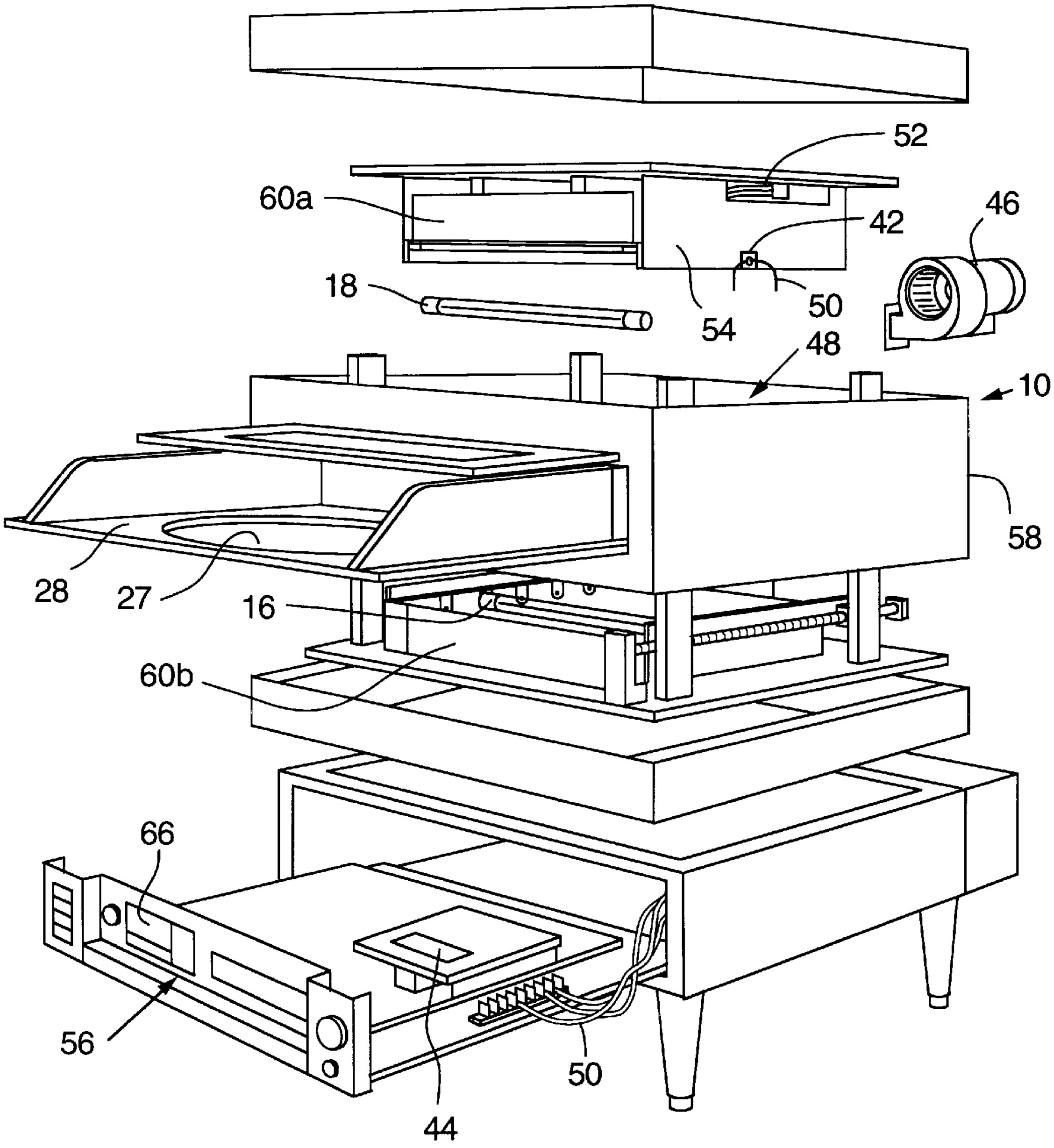
FIG. 1C is an exploded view of an oven according to the present invention showing the thermistor in a preferred location.

Referring to FIG. 1C, a thermistor 42 is positioned within cooking chamber 48. The preferred thermistor is a 10 kohm axial, glass-bodied thermistor that is inserted into a low mass aluminum holder. The thermistor is positioned so that it can detect temperature changes that closely track the changes in heat energy being stored in the oven.

In the embodiment of FIG. 1C, the thermistor is attached to the lower side of an upper reflector assembly 60*a* and is positioned approximately within 1 inch from the horizontal plane containing the axes of the upper array of lamps 18. The location was selected so that the rise time of the thermistor temperature matched the rise time of the oven secondary heating, which is proportional to the temperature increase of a dish of water, simulating food, placed in the oven and heated solely by oven secondary heating, that is, with no lamps on.

Leads 43 connect the thermistor to the thermistor circuit. The leads pass through the body of the oven 10 and interface with the microprocessor circuit 44 near the front panel 56 of the oven. An evacuation tube (not shown) extends from the rear panel 58 of the oven and is connected to a fan 46.

Figure 2:
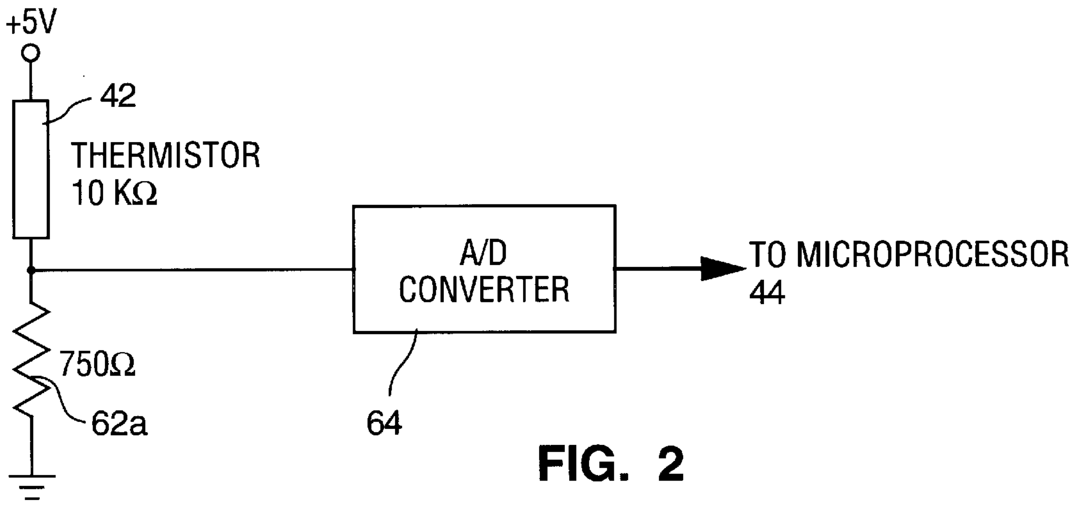
FIGS. 2 and 3 are schematic representations of the thermistor and microprocessor configurations according to the present invention.
Figure 3:
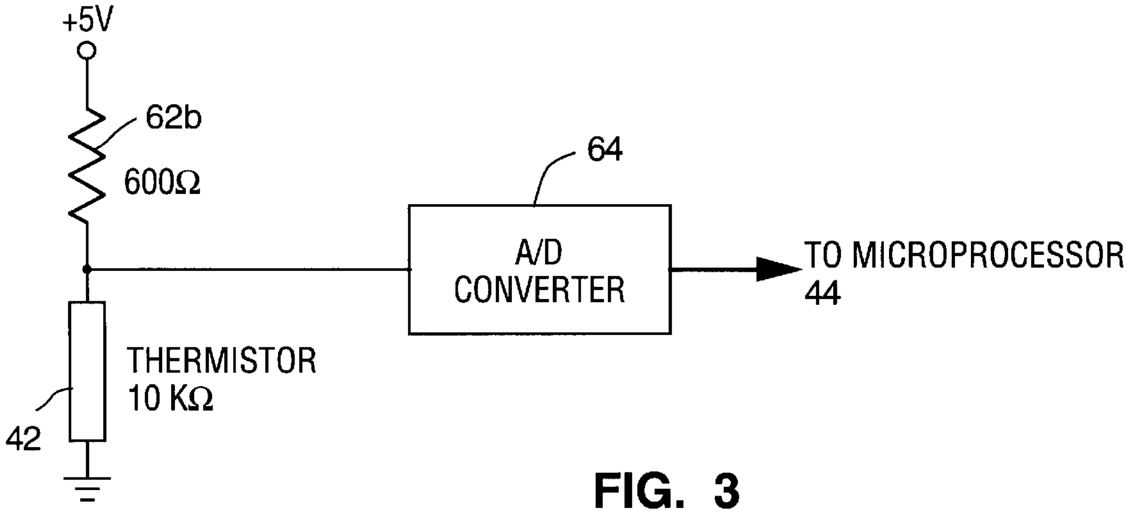

Thermistor circuitry for two radiant ovens having different chamber sizes are schematically illustrated in FIGS. 2 and 3. The first embodiment of the circuitry, designed for an oven having a 9 inch diameter circular cooking area, is comprised of a 10 kohm thermistor 42 and a 750 ohm resistor 62*a* connected across a 5 V potential. The thermistor is connected at the higher potential while the resistor is connected at the lower potential. When the oven temperature increases, the voltage across the resistor increases. This increase in voltage is converted to a digital signal by an analog-to-digital converter 64 and delivered to a microprocessor 44. If the oven temperature has increased the microprocessor decreases the total on cooking time from the predetermined normal cooking time to a cooking time that is commensurate with the current oven temperature. The microprocessor may also adjust the lamp intensity, either alone or in combination with the adjustments to cooking time.

In the thermistor circuitry of FIG. 3, which was designed for use in an oven having a 14 inch diameter circular cooking area, a 600 ohm resistor 62*b* and a 10 kohm thermistor 42 are connected across a 5 V potential, with the thermistor connected at the lower potential and the resistor connected at the higher potential. An increase in the oven temperature produces a decrease in voltage across the thermistor. This voltage drop is converted to a digital signal by the analog-to-digital converter and delivered to the microprocessor which adjusts oven temperature or lamp intensity as described above.

Figure 4:
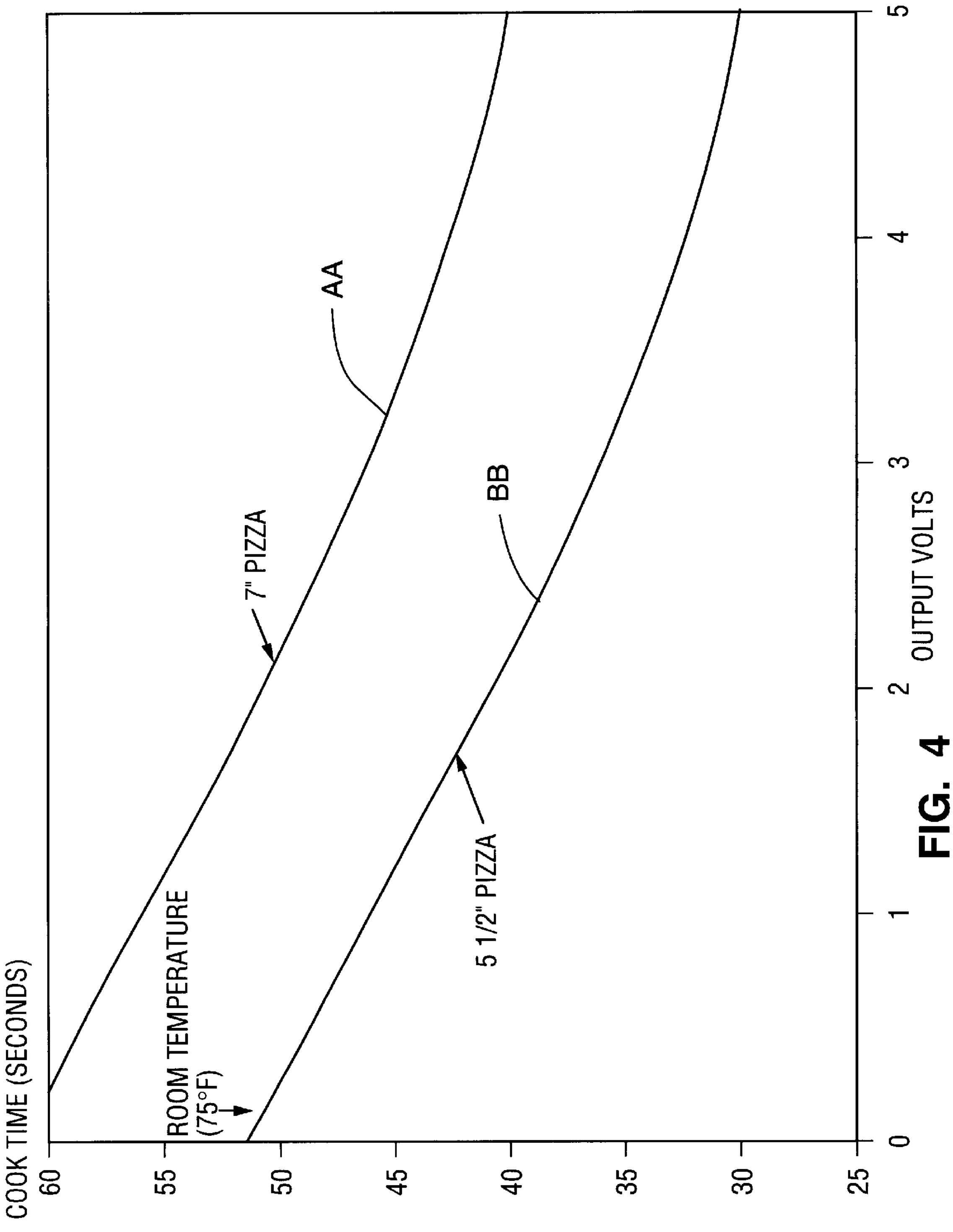
FIG. 4 shows a preferred compensation curve for use with the thermistor configuration of FIG. 2.
Figure 5:
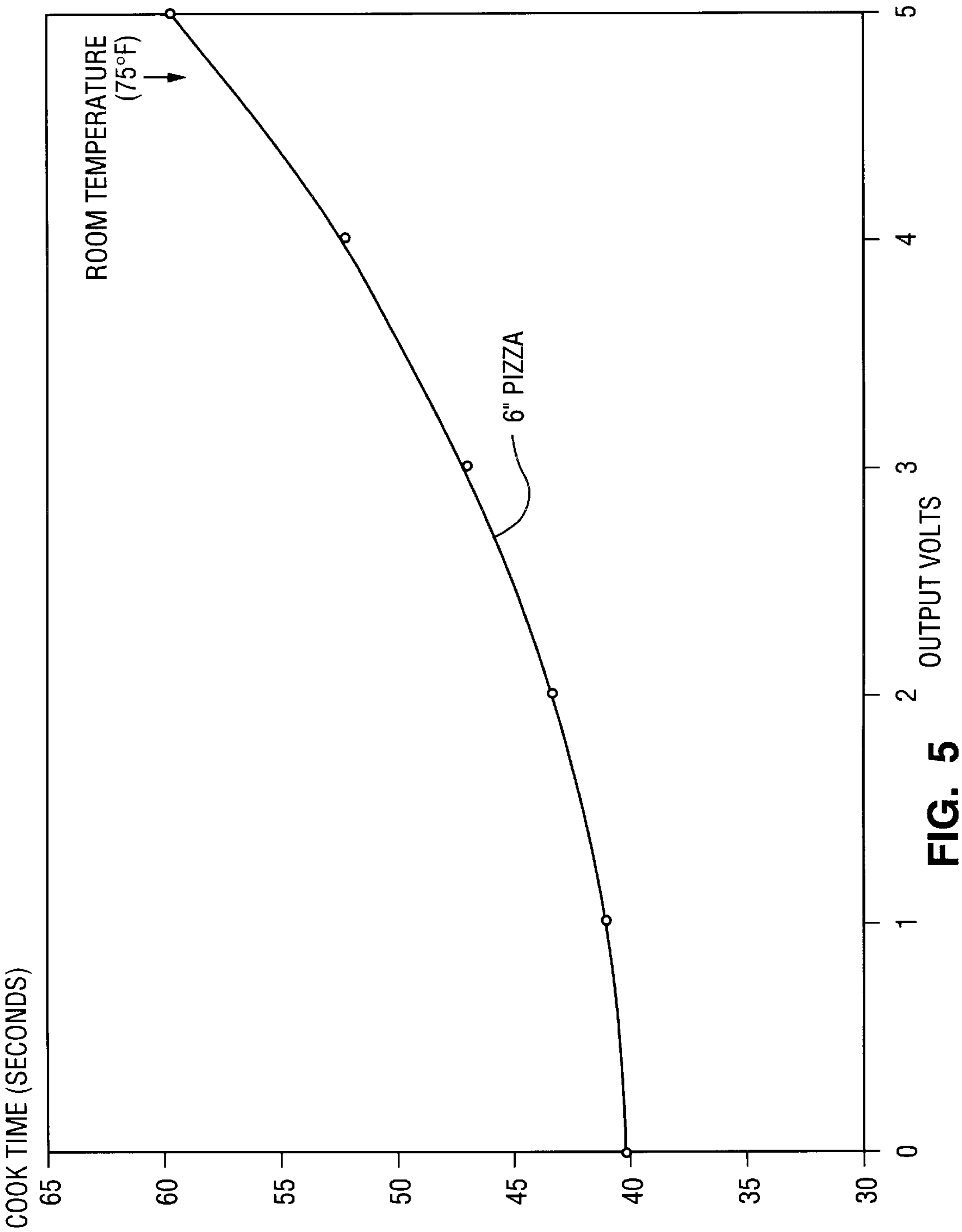
FIG. 5 shows a preferred compensation curve for use with the thermistor configuration of FIG. 3.

The algorithm used by the microprocessor 44, as disclosed in application Ser. No. 08/039,621, filed Mar. 30, 1993, to adjust the cooking time is based on a compensation curve. Compensation curves for the embodiments of the invention illustrated in FIGS. 1–3 are shown in FIGS. 4 and 5. The curves represent plots of cooking time versus the output voltage across the thermistor circuitry.

FIG. 4 shows a pair of compensation curves which correspond to the compensation circuitry and algorithm for an oven which has a 9 inch diameter cooking area and which utilizes the thermistor configuration of FIG. 2. Curve AA illustrates the decrease that occurs in the cooking time for a 7 inch pizza as the voltage across the thermistor circuitry decreases. Curve BB represents the same measurement for a 5½ inch pizza. Because the slope of the compensation curve does not change, a single compensation algorithm based on the slope of the compensation curve may be used for the microprocessor. This compensation curve was tested using various food types, such as chicken, and it was discovered that the curve successfully adjusts the cooking time for a variety of foods.

FIG. 5 shows the compensation curve for an oven which has a 14 inch diameter cooking area and which utilizes the inverted thermistor configuration of FIG. 3. This curve was generated using a 6 inch diameter pizza and was found to also be consistent for various food types.

To use the oven of the present invention, the food item sought to be cooked is positioned on the rack 31 and the door 29 is closed. The cooking time for a specified food item is entered into the microprocessor 44 using the buttons 66 on the front panel 56 causing the lamps to be illuminated. The thermistor 44 continuously monitors the oven temperature. Increases and decreases in voltage are detected by the analog-to-digital converter and delivered to the microprocessor in the form of digital signals. Using an algorithm based upon the compensation curve for the oven, the microprocessor in turn adjusts the cooking time upwards or downwards to compensate for decreases and increases, respectively, in the oven temperature. A fan evacuates a portion of the heated air through the evacuation tube to partially reduce the amount of heating of the oven chamber.

Figure 6A:
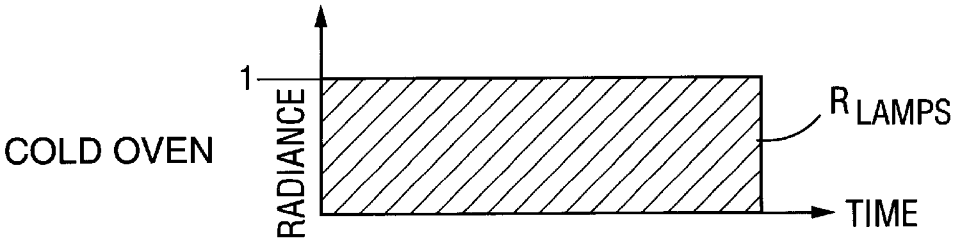
FIGS. 6A–6D are graphs of radiance applied to food in a lightwave oven plotted versus the cooking time for food in the lightwave oven to show the energy applied to the food with FIG. 6A illustrating a cold oven, FIG. 6B illustrating a hot oven with no compensation, FIG. 6C illustrating a hot oven with compensation of the embodiment described with respect to FIGS. 1–5, and FIG. 6D illustrating a hot oven with compensation of the preferred embodiment described with respect to FIGS. 7–14.
Figure 6B:
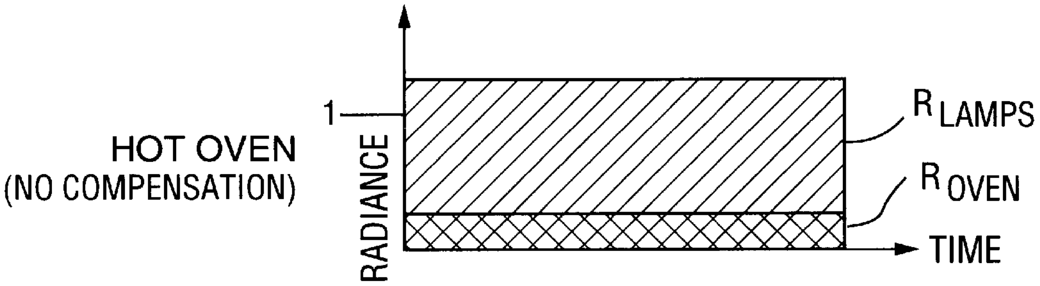
Figure 6C:
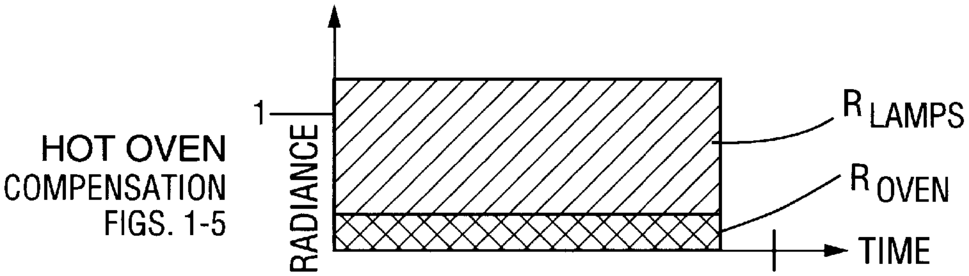

Referring to FIGS. 6A–C, there is an illustration of what is accomplished by the algorithm used by the microprocessor to adjust the cooking time.

FIG. 6A is a graph of the radiance created by all of the lamps on the food positioned in the oven plotted versus time so that the shaded area is representative of the energy that is delivered to the food as a product of the power times the time and is the sum of the power delivered by the lamps when cooking of a given food according to a given recipe when cooking is initiated when the oven is cold, i.e., at room temperature. In that situation there is no energy delivered to the food by oven secondary heating itself other than the lamps because the typical cooking time with a lightwave oven is so fast.

When a series of food items are consecutively cooked in the oven, the oven will have a residual elevated temperature which provides extra heating to the food independent of the lamps and the amount of the oven secondary heating will increase with the successive cooking of food items without allowing the oven to cool inbetween those successive cooking cycles.

FIGS. 6B is an illustration of the energy provided to the food cooked in accordance with the standard recipe which begins with a residual elevated temperature in the oven which provides an oven secondary heating $R_{oven}$ during the cooking cycle. Without compensating for the radiance $R_{oven}$ due to the residual elevated temperature the food item cooked at the normal cooking time for the given recipe for the given food will be overcooked as shown in FIG. 6B.

The cooking operation as described with respect to FIG. 1–5, compensates for the residual elevated temperature due to $R_{oven}$ from the oven is illustrated in FIG. 6C, wherein the overall cooking time has been reduced to reduce the total energy applied to the food during the recipe cooking cycle by both the lamp radiance $R_{lamps}$ and $R_{oven}$ to be equal to the energy applied to the food in a cooking operation beginning at room temperature as shown in FIG. 6A. Thus, the total energy represented by the shaded area in FIG. 6A and in FIG. 6C is the same.

While the method and apparatus described with respect to FIGS. 1–5 and 6A–C operate well with many types of foods, it has been discovered with respect to certain types of foods that the shortened cooking time does not produce a cooked product as satisfactory as the product cooked at the normal cooking time for a given recipe and starting with a cold oven. For example, in cooking raw dough pizza while it is possible to control the level of browning, it is also important to keep the percentage of moisture loss from the central temperature of the pizza substantially the same from pizza to pizza. Due to the fact that operation in accordance with the description with respect to FIGS. 1–5 and 6A–C, which keeps the product in the oven for less and less time as the oven heats up, it often is not possible to meet these last two objectives to an acceptable degree.

The preferred embodiment of the present invention described hereafter overcomes the difficulties encountered with the foregoing compensation method and apparatus.

DESCRIPTION OF THE PREFERRED EMBODIMENT

The preferred embodiment will be described with reference to a lightwave oven construction and operation as illustrated in FIGS. 7–14, but can operate equally as well in the oven configurations illustrated in FIGS. 1A–1C when utilizing the construction and operation of the compensation aspects of the preferred embodiment.

The algorithm used in the preferred embodiment employs a method and apparatus wherein the food is cooked over a period of time the same as the normal cooking time for a given recipe for cooking given food starting with a cold oven but insures that the energy applied to the food as a result of the radiance from the lamps $R_{lamps}$ and the oven secondary heating $R_{oven}$ is the same as the total energy from radiance $R_{lamps}$ from the lamps alone for the selected recipe time in an oven starting at room temperature.

The algorithm in the preferred embodiment does not take time off the recipe as the oven heats up; the product is still in the oven for the same total time as it is for the recipe when the oven is cold. Instead, in accordance with the preferred embodiment certain amounts of top total off time for the top and bottom banks of lamps are inserted into the lamp timing to compensate for the extra oven secondary heating $R_{oven}$ due to the increasing oven temperature.

Figure 6D:
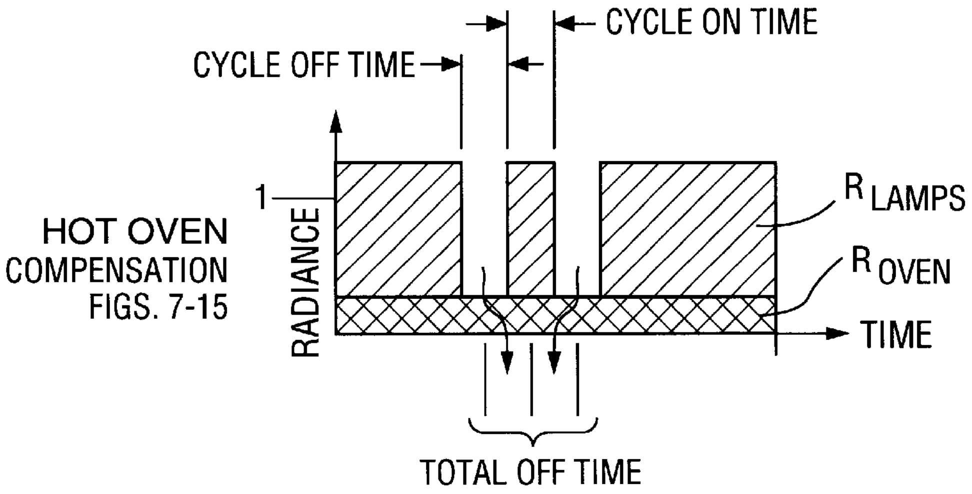
Figure 7:
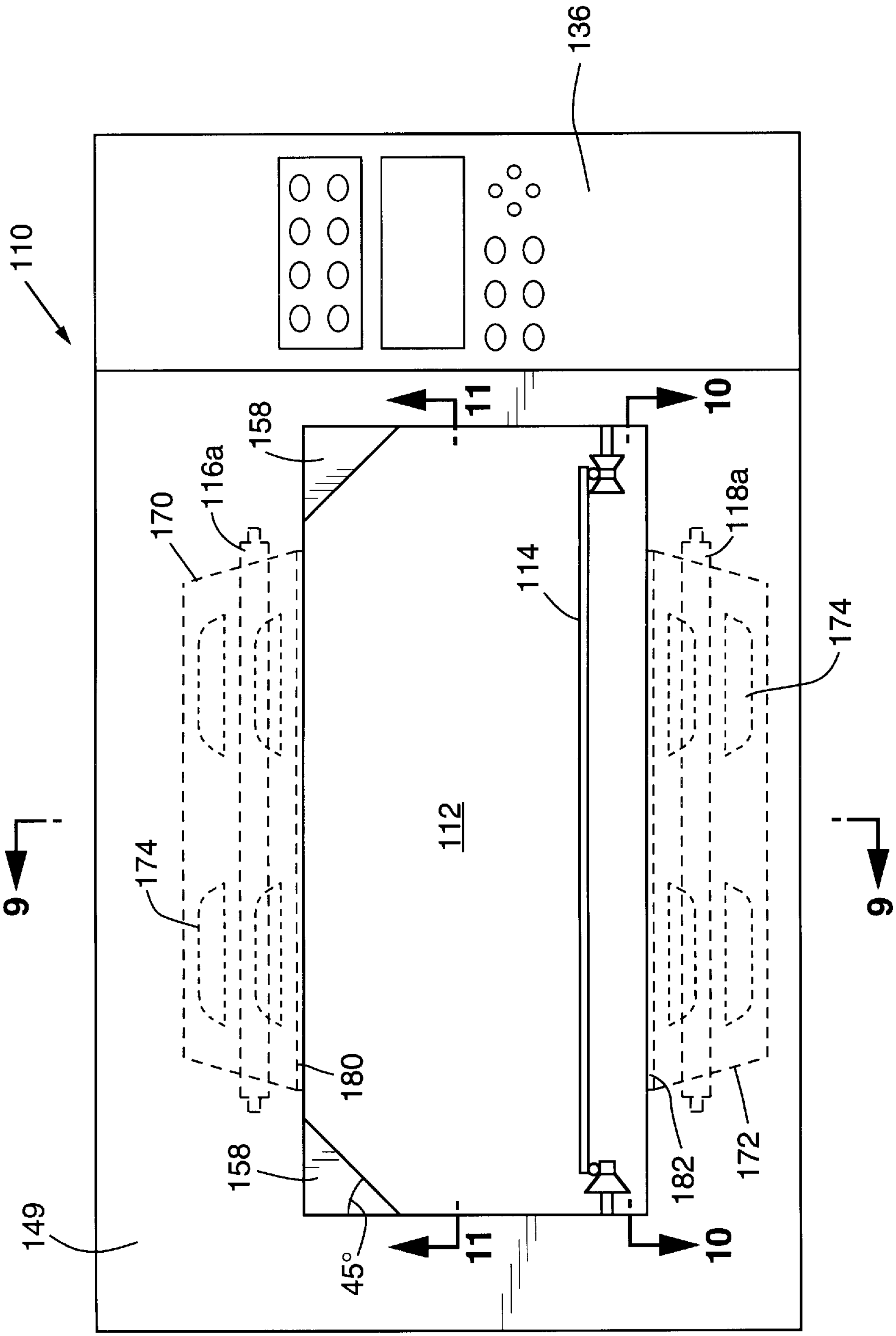
FIG. 7 is a front elevational view of a lightwave oven in accordance with the preferred embodiment of the present invention with the door not shown.
Figure 8:
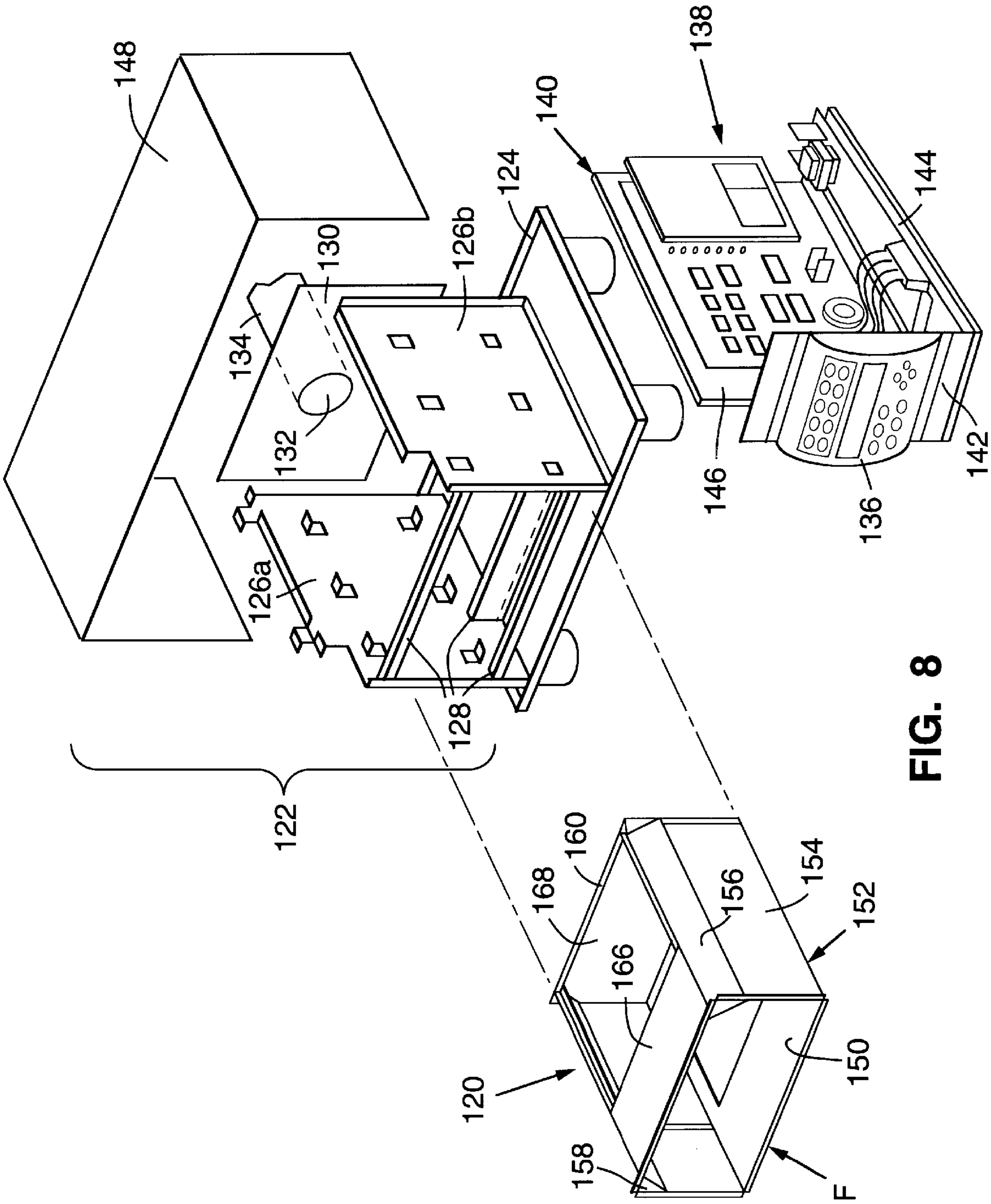
FIG. 8 is an exploded view of the housing of the lightwave oven as shown in FIG. 1.
Figure 9:
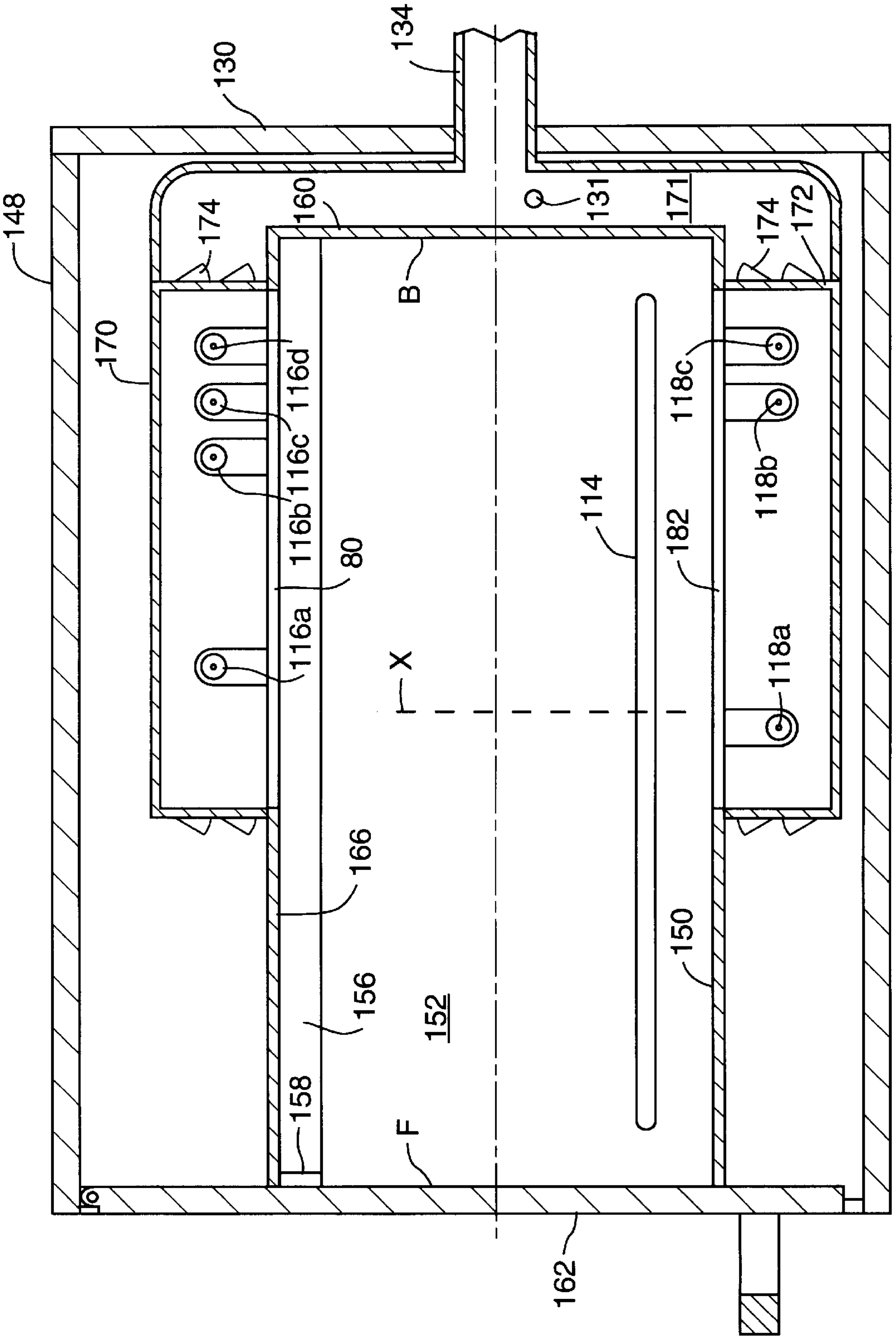
FIG. 9 is a elevational cross-sectional view of the lightwave oven as shown in FIG. 1.

As shown in FIG. 6D, the power to the lamps in the preferred embodiment is periodically reduced, specifically turned off, for periods of reduced power time during the normal cooking time so that the energy provided to the food by the lamps is reduced by the amount equivalent to the energy provided to the food by the residual elevated temperature. The top and bottom total off times are broken up into blocks of time termed the "cycle off time", with blocks of time termed the "cycle on time" between them centered substantially mid-way during the length of the normal cooking time. It would be possible to have the special case where all the off times were in one block, that is, a cycle on time of 0, but while this would work it would not be optimal since it has been found that browning can be retarded by cycling the lamps on and off, which is generally desirable since browning tends to be advanced due to oven secondary heating, wherein the heat is coupled in at the surface rather than at both the surface and subsurface, as is the case with lamp heating. This method and apparatus enables the reactions which take place during a given cooking period for a particular food item to still take place during that time but without increased energy due to oven radiance from the temperature elevation of the oven at the beginning of the cooking cycle.

The shaded area in FIGS. 6D, is the same as the shaded area for the cooking cycle beginning with a cold oven as illustrated in FIG. 6A, and the shaded area for the compensated foreshortened cooking time illustrated in FIG. 6C, but with the cooking time matching the given recipe for cooking the given food as shown in FIG. 6A. This "equal areas" interpretation of the off-time algorithm is explained below assuming that there is just one lamp radiance value for all of the lamps of the oven. (As will be described hereafter, there may be different radiance values in different oven constructions, typically attributable to different radiance from the upper or top lamps and the lower or bottom lamps.)

Since it is desired to have the energy delivered to the food not be a function of oven secondary heating $R_{oven}$ the energy to be delivered is equal to the product of the power times the time and is the sum of the power delivered by the lamps and by the oven.

$$R_{lamps}\times(T_{rec}-T_{off})+R_{oven}\times T_{rec}=\text{constant}$$

When the oven is cold, $T_{off}=0$ and $R_{oven}=0$, so that:

$$R_{lamps}\times(T_{rec}-T_{off})+R_{oven}\times T_{rec}=R_{lamps}\times T_{rec}$$

Then $$T_{off}=(R_{oven}\ T_{rec})/R_{lamps}$$

where $T_{rec}$=recipe time (set by user or normal cooking time)

$R_{lamps}$=average lamp radiance (set by user)

$R_{oven}$=oven secondary heating (which is a function of the thermistor temperature and is predetermined by measurements).

Figure 15:
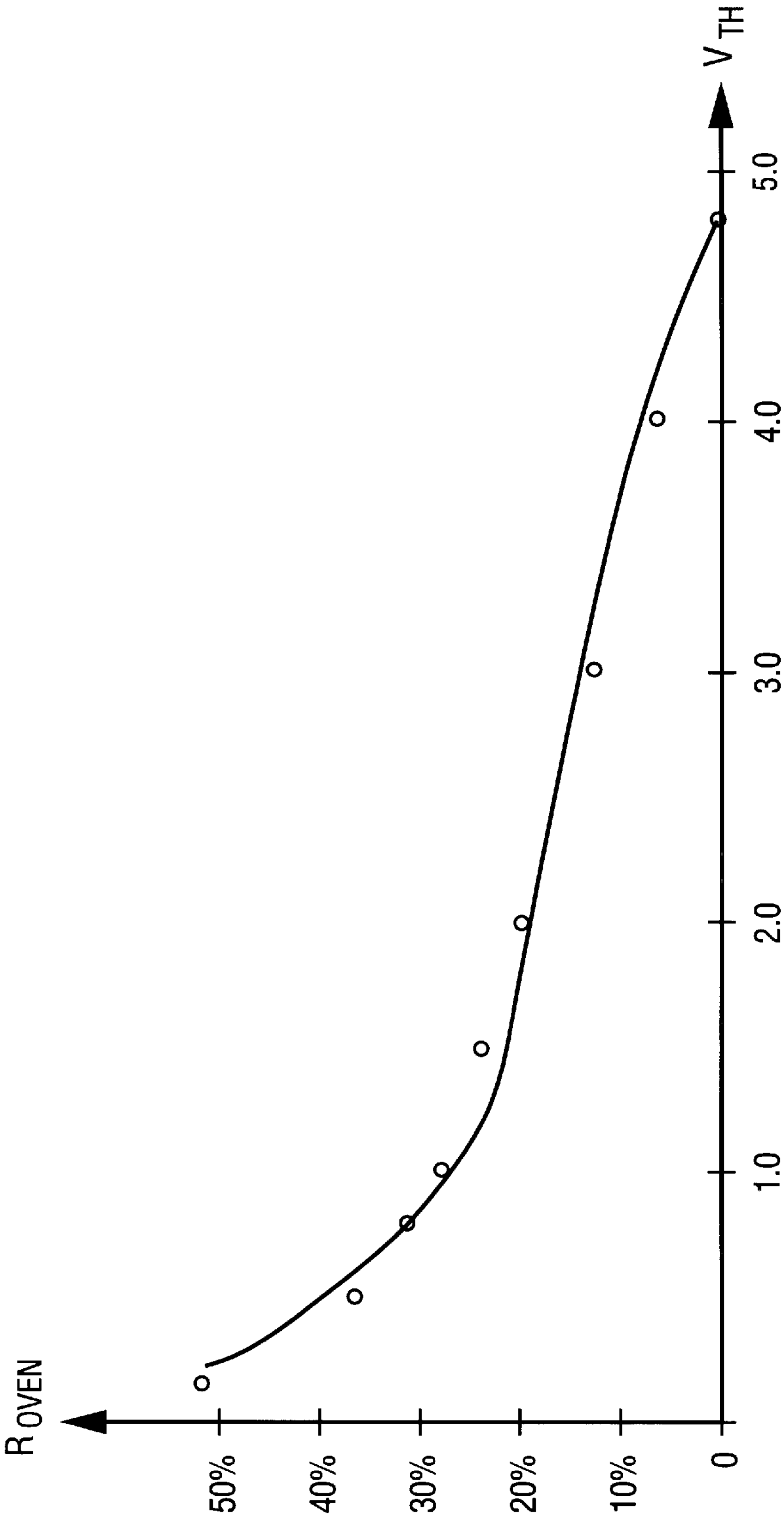
FIG. 15 is a graph of oven secondary heating as a percentage of total lamp power plotted against thermistor voltage for the oven of the preferred embodiment.

A plot of $R_{oven}$ vs. the thermistor voltage is shown in FIG. 15.

The total off time ($T_{off}$) is distributed through the middle of the recipe.

Referring to FIGS. 7–11, the oven 110 has an interior cavity 112, a rotating circular grill 114 mounted within the cavity, and radiant energy sources, or lamps 116*a*–116*d*, 118*a*–118*c* of the type described above respectively mounted above and below the grill. The oven 110 has an internal housing 120 which is mounted within an external housing 122. External housing 122 includes a substantially horizontal base 24, a frame which includes side walls 126*a*, 126*b* extending vertically of the base 124 and support members 128 extending between the walls 126.

A rear wall plate 30 extends between the walls 126 and extends vertically of the base 124. An exhaust opening 132 is centered on the rear wall plate 130, and an exhaust tube 134 extends from the opening 132 to evacuate heated air from the oven.

Operation and control of the oven (and thus illumination of the lamps) is carried out using a control panel 136 located at the front of the oven 110. The control panel 136 is electrically and electronically coupled to the oven's circuitry, which includes a processor, control circuitry, and power components and circuitry, collectively designated 138 in FIG. 8. The control panel 136 and circuitry 138 are attached to control panel housing 140 which includes a front wall 142, base wall 144, and side wall 146 and which is mounted to base plate 124 such that side wall 146 is adjacent to side wall 126*b*.

A cover 148 is attached to the base 124 and, with the wall 130 and base 124 encloses the oven 110. A front plate 149 (FIG. 7) having a rectangular opening leading to the oven chamber 112 is mounted to the front of the oven and a door 162 is hinged to front plate 149.

Interior housing 120 includes a bottom plate 150 and a pair of side walls 152 extending vertically of the bottom plate 150. A rectangular opening 151 is formed in bottom plate 150.

A top panel 166 extends between the side walls 152. Top panel 166 does not extend for the entire front-to-back length of the side walls 152 leaving a large opening 168 (FIG. 8) between the top panel 166 and the back wall 160 of the interior chamber.

An upper reflector housing 170, and a lower reflector housing 172 are each mounted within the oven. Each has an inward-facing side having a mirrored surface. Upper reflector housing 170 is positioned such that its inward facing side is positioned to face downwardly above opening 168 at the top of the interior housing 112, while lower reflector housing 172 is positioned such that its interior facing side faces upwardly through opening 151 in bottom plate 150.

Vents 174 are formed in front and rear sides of the reflector housings 170, 172 to permit the escape of heated air.

The laterally positioned sides of reflector housings 170, 172 include slots through which the ends of the lamps 116*a*–116*d*, 118*a*–118*c* extend. The lamps 116*a*–116*d*, 118*a*–118*c* are mounted within the oven to receive power in a conventional manner.

Two radiation transparent plates are mounted inside the oven to isolate the cooking chamber from the radiant lamps, making the oven easier to clean.

A thermistor 131 is positioned in a plenum chamber 175 between rear wall plate 130 of external housing 122 and back wall 160 of internal housing 120. The thermistor 131 detects changes in oven temperature caused by successive cooking operations. Thermistor 131 is preferably positioned approximately 1 inch from the rear surface of back wall 160 and is preferably centered between walls 154 (which are 18 inches apart). The height location of the thermistor is approximately 3.7 inches above the horizontal plane in which bottom plate 150 is located.

The operational algorithm of this preferred embodiment is to provide operation of the oven to keep the total energy delivered to the upper and lower surfaces of the product constant. It assumes that the oven radiance due to oven heating can be modeled by a two flux model (radiance as seen by the upper and lower surfaces of the food, either directly or indirectly, through a pan or dish of some sort), and is a function of the reading of thermistor 131, which measures cavity temperature at a particular point in the oven. For the optimal placement of the thermistor 131, it is important that the sensor temperature reading reflect the conditions the food in the oven cavity is exposed to. Placement can be accomplished by measuring the rise time of the oven secondary heating and picking a position in the oven or the oven exhaust duct that matches this rise time. In this embodiment the location is in the exhaust duct. The oven secondary heating is measured by heating the oven up to a certain temperature and then putting a Visionware dish of water in the oven for a fixed time, with the lamps off, withdrawing the dish and measuring the water temperature rise.

In the preferred embodiment, the cycle off time is 4 seconds and the cycle on time is 3 seconds. When the total off time is divided into separate off periods any remainder in the off time determined by the microprocessor is tacked on with an off time pulse less than 4 seconds immediately following the string of 4 seconds cycle off times and 3 seconds cycle on time pulses.

Cycle on and cycle off times of 3 or 4 seconds, respectively, are the preferred embodiment but these values may vary somewhat. It is necessary that these times be long compared to the rise and fall heating times of the lamp filament (about 0.15 seconds). They should be comparable to or shorter than the time it takes for a food to change in browning level from medium to slightly dark (10–20 seconds).

It is possible with the present invention to slide the off time blocks to different locations in the total time period. This can be useful in controlling browning which takes place near the end of the cooking cycle.

It has been discovered that different food types and different amounts of food need differing levels of compensation. In particular, foods that have a lot of water in them, such as meats, require significantly less off-time then do foods with very little water in them, such as some types of par-baked pizza. The amount of compensation needed for raw dough pizza lies in between these extremes.

In accordance with another aspect of the method and apparatus of this preferred embodiment of the invention, the total energy applied to the food either by the lamps alone in a cold oven or by the lamps in conjunction with heating from the oven secondary heating is adjusted to increase or decrease the energy applied to the food by respectively increasing or shortening the length of time that the lamps are periodically turned off based upon the nature of the food being cooked. The oven includes adjustment between the number of levels, such as 5 different levels designated 1 to 5, 1 being the most time off and 5 being the least time off the normal recipe time. This compensation value scales the cycle off time (without changing the cycle on time between periodic off periods) in the respective ratios 2.00; 1.41; 1.00; 0.71; and 0.5 for the five compensation values designated 1 to 5, respectively. If the user does not specify a value, the microprocessor selects the default value of 3 corresponding to the normal compensation.

As an example, for the preferred embodiment with a total off time of 20 seconds, compensation to decrease the applied energy to level 1 increases the total off time by the factor of 2 to 40 seconds whereas compensation to decrease the total off time by a factor of 0.5 to level 5 for increasing the total applied energy results in a total off time of 10 seconds.

FIG. 12 illustrates the different food type compensation level control button on the panel of the oven for recipe #1, which the user has selected and wherein the microprocessor has selected the default third level of compensation where the compensation value scale is 1.0 or the normally selected 4 second cycle off time. By pressing the selector in the area of the indicated "1-LIGHTER" compensation, the microprocessor will shift the compensation value toward value 1 (8 seconds) and indicate the particular compensation value selected at the bottom of the selector. Similarly, by pressing the selector in the area indicated "5-DARKER" compensation will shift toward value 5 (2 seconds).

For the geometry and construction of the oven described with respect to this preferred embodiment, an additional compensation is provided by the algorithm with respect to the residual elevated temperature because the lower or bottom bank of lamps are closer to the food by a factor of 2 or 3 times than the bank of upper or top lamps. Since a large portion of the residual elevated temperature results from radiation from reflectors located on the side of the lamps away from the food, this results in much higher oven radiance from the lower or bottom bank of lamps then from the upper or top bank of lamps which is not sensed by the thermistor and overcooking of the bottom of the food product. Therefore, in the preferred embodiment when compensation is applied for oven secondary heating in the lightwave oven, the bottom total off time is approximately 1.5 times the top total off time. This value of 1.5 is specific to a particular oven geometry and will change for different oven geometries.

Figure 13A:
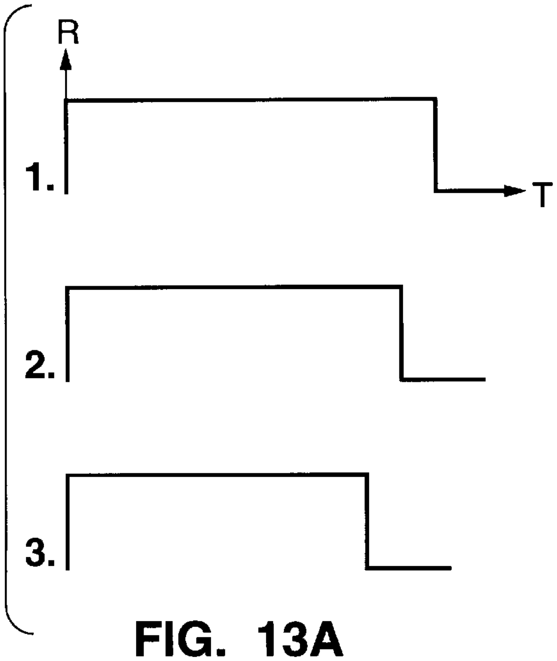
FIGS. 13A–13C are views similar to FIGS. 6A–6C illustrating another aspect of the present invention.
Figure 13B:
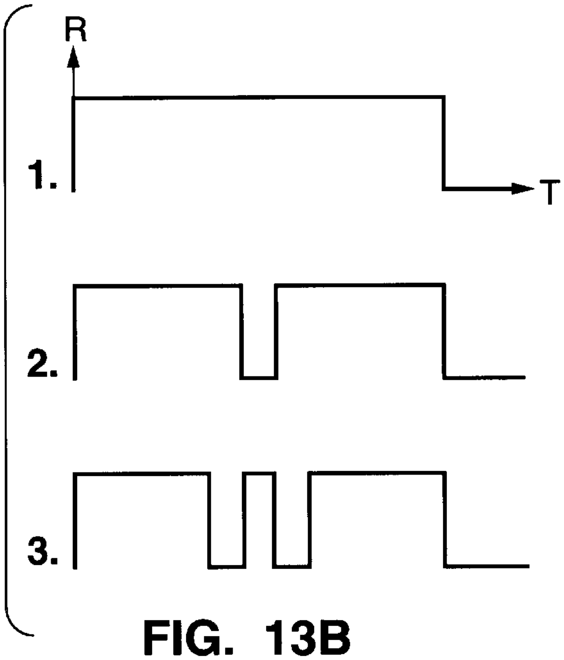
Figure 13C:
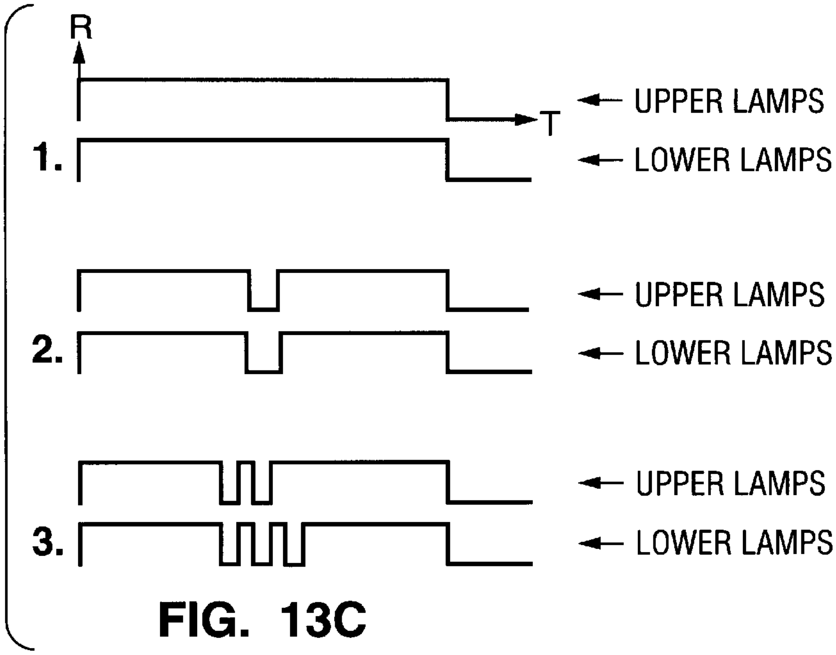

FIGS. 13A–13C are graphs of radiance plotted versus time with the plots in each of the views numbered from 1 to 3 showing the results of compensation as the residual heat remaining in the oven increases from view 1 to view 2 and from view 2 to view 3. FIG. 13A shows compensation for the embodiment of FIGS. 1–5. FIG. 13B shows the compensation preferred by embodiment of FIGS. 6D, 7–12 and 14 considering the accumulative affect in the oven as a whole, and FIG. 13C reflects that compensation achieved in the preferred embodiment with separate control of compensation for the upper and lower lamps.

Another factor in establishing the algorithm is the fact that oven radiance due to oven secondary heating is at long enough wavelengths (with most of the energy being at wavelengths longer than 3 $\mu$m) because all foods are highly absorbing since water, which is highly absorbing of such wavelengths, is a primary constituent of foods in these wavelength ranges.

In lightwave ovens constructed in accordance with the present invention, it is possible to use lamps that have different spectra distributions so that particular lamps of shorter wavelength can operate for deeper heating of food and lamps with spectra at longer wavelengths can be used more for the browning cycle.

While the preferred embodiment describes the operation in which the lamps are turned completely off, it is possible in alternative embodiments of the present invention to reduce the power to one, or more or all of the lamps without turning off the power to those one, or more or all lamps. Similarly, it would be possible to amplitude modulate the lamp intensities or combinations of these such as time modulation plus amplitude modulation. Turning the lamps off for not too short a time is preferred because amplitude modulation and very short periods of time, such as 0.2 seconds, when the lamps are being turned on or being turned off result in a different location of the peak wavelength in the overall spectrum emitted by the lamps and is not believed advantageous for the majority of cooking done with lightwave ovens in accordance with this invention.

Figure 14:
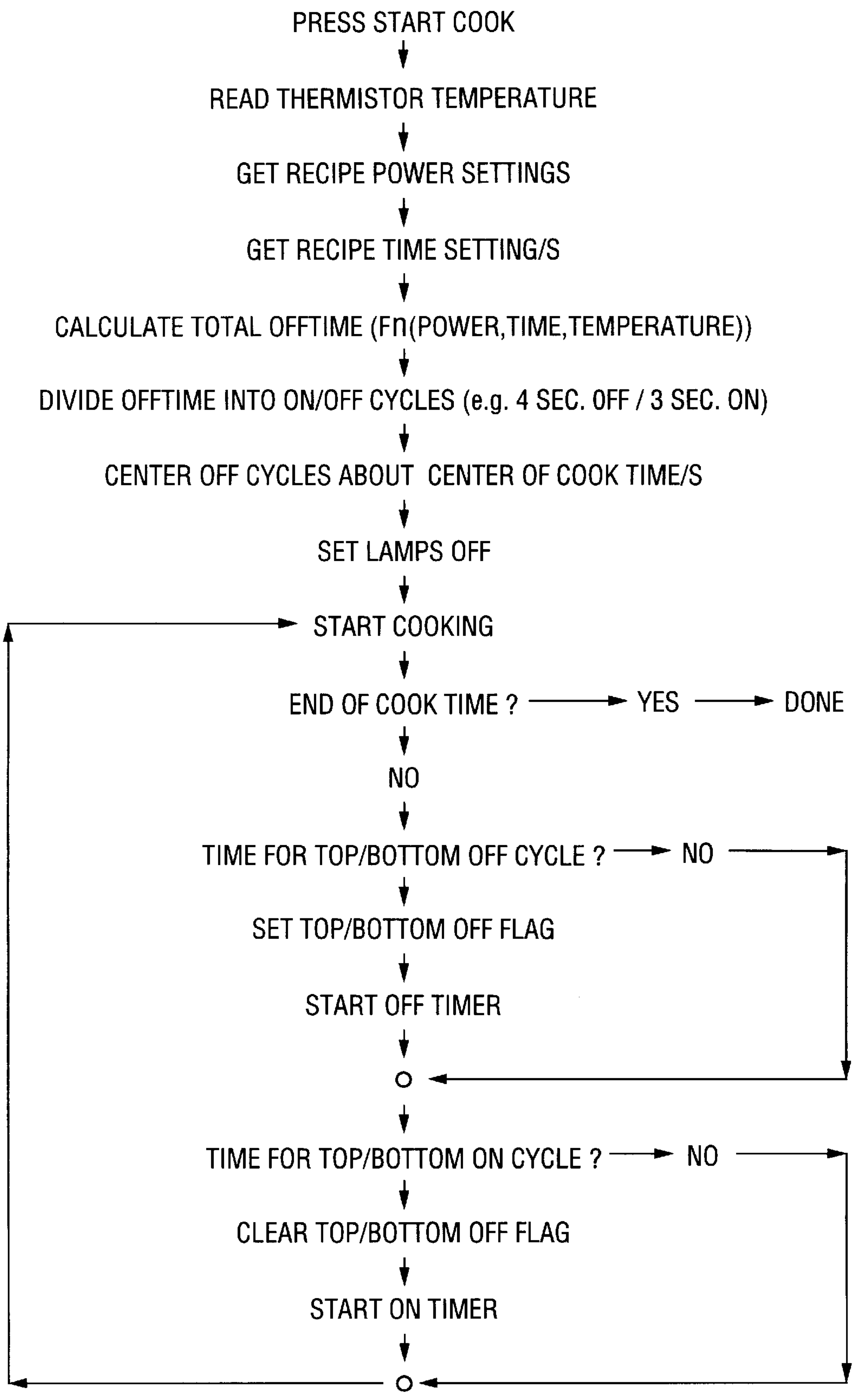
FIG. 14 is a flow diagram of the operation of a lightwave oven in accordance with the preferred embodiment.

Referring now to FIG. 14, there is shown a flow diagram of the operation of the invention in accordance with the preferred embodiment. The cooking cycle of food placed in the lightwave oven is initiated by pressing the start cook button. The thermistor temperature is read and the recipe power and recipe time settings are retrieved. With this data the total off time is calculated based upon the power, time and thermistor temperature. The total off time is divided into on/off cycles (e.g., 4 seconds off and 3 seconds on). The number of off cycles are adjusted about the center of the cook time and cooking is initiated. When the program reaches a command to turn the power off, the decision is made whether the end of the total cook time has been reached in which case the food is done and the cook cycle shuts off or whether the time for the top/bottom off cycle is reached in which case the top/bottom off flag is set and the off timer is started. If the time for top/bottom off cycle is not read, the program processes to the step for timing the top/bottom on cycle which if it exists clears the top/bottom off flag and starts the timer of the on cycle and the program reverts to the start cooking step to proceed either to the next off/on cycle or the end of the total cooking time.

In an alternative embodiment to performing the cycle off time, power reduction without turning off the lamps or decreasing the lamp intensities mid-way during the length of the normal cooking time, at least some of such cycle off, power reduction and/or decrease of intensity can be provided at the end of the total on time and the food kept in the oven until completion of cooking using the oven secondary heat.

It may well be that a given recipe is divided up into separate successive cooking periods which use different cooking parameters and that the present invention would be employed separately in each cooking period beginning with a thermistor determination at the beginning of each separate cooking period.

It is to be understood that the present invention is not limited to the embodiments described above and illustrated herein, but encompasses any and all variations falling within the scope of the appended claims.

We claim:

1. The method of cooking food in an oven for cooking with at least one high power lamp providing radiant energy having a significant portion of the energy in the visible and near visible light ranges of the electromagnetic spectrum, the method comprising the steps of:

a. applying continuous power to said one lamp, b. determining an elevation temperature at a given location on the oven where oven secondary heating has a relation to the cooking time of food cooked in the oven, c. determining the reduction of the total lamp on time for a given recipe for cooking given food by a time amount related to the determined temperature elevation at said given location, and d. periodically reducing the power to said one lamp for one or more periods of reduced power time substantially midway during the normal cooking time at the beginning of which the elevated temperature was determined for said given recipe with the total time of the periods of reduced power producing a reduction of the energy provided to the portion of the given food by said one lamp in an amount substantially equivalent to the amount of energy provided to said portion of the given food by the oven secondary heating.

2. The method of claim 1 wherein the step of periodically reducing the power to said one lamp comprises periodically turning off the power to said one lamp.

3. The method of claim 1 wherein the step of periodically reducing the power to said one lamp comprises periodically lowering the power to said one lamp without turning off the power to said one lamp.

4. The method of claim 3 wherein the step of periodically reducing the power to said one lamp includes reducing the power for a first period of time before the end of the cooking cycle and after said one lamp has been at full power for a second period of time.

5. The method of claim 4 wherein the step of periodically reducing the power to said one lamp includes reducing the power for substantially 4 seconds before the end of the cooking cycle and after said one lamp has been at full power for substantially 3 seconds.

6. The method of claim 4 including the step of adjusting the periodically reduced power to be longer or shorter based upon the nature of the food being cooked.

7. The method of cooking food in an oven with at least one upper high power lamp above a location for positioning food to be cooked and at least one lower high power lamp below the location for positioning food to be cooked, said upper and lower lamps providing radiant energy having a portion of the energy in the visible and near visible light ranges of the electromagnetic spectrum, the method comprising the steps of:

a. applying continuous power to said upper and lower lamps, b. determining an elevation temperature at a given location of the oven where oven secondary heating has a relation to the cooking time of food to be cooked in the oven, c. determining the reduction of the total lamp on time for a given recipe for cooking given food by a time amount related to the determined temperature elevation, and d. periodically reducing the power to said upper and lower lamps for periods of time substantially midway during the normal cooking time at the beginning of which the elevated temperature was determined for said given recipe with the total time of the periods of reduced power producing a reduction of the energy provided to the given food by said upper and lower lamps by an amount substantially equivalent to the amount of energy provided to the given food by the oven secondary heating.

8. The method of claim 7 wherein the step of periodically reducing the power to said upper and lower lamps comprises periodically turning off the power to said upper and lower lamps.

9. The method of claim 7 wherein the step of periodically reducing the power to said upper and lower lamps comprises periodically lowering the power to said upper and lower lamps without turning off the power to said upper and lower lamps.

10. The method of claim 8 wherein the step of periodically reducing the power to said upper and lower lamps includes reducing the power for a first period of time before the end of the cooking cycle and after said lamps have been at full power for a second period of time.

11. The method of claim 10 wherein the step of periodically reducing the power to said lamps includes reducing the power for substantially 4 seconds before the end of the cooking cycle and after said lamps have been at full power for substantially 3 seconds.

12. The method of claim 7 including the step of adjusting the periodically reduced power to be longer or shorter based upon the nature of the food being cooked.

13. The method of claim 7 including lengthening the periodic time of the reduced power of said upper lamp or said lower lamp, depending on whether the oven's heating couples more into the upper or lower surface of the food, is closer to the food being cooked.

14. In the method of claim 7 evacuating at least a portion of the heated air from the oven to reduce the oven secondary heating.

15. The method of cooking food in an oven with at least one upper high power lamp above a location for positioning food to be cooked and at least one lower high power lamp below the location for positioning food to be cooked, said upper and lower lamps providing radiant energy having a portion of the energy in the visible and near visible light ranges of the electromagnetic spectrum, the method comprising the steps of:

a. applying continuous power to said upper and lower lamps, b. determining an elevation temperature at a given location on the oven where oven secondary temperature has a relation to the cooking time of food to be cooked in the oven, c. determining the reduction of the total lamp on time for a given recipe for cooking given food by a time amount related to the determined temperature elevation at said given location, and d. periodically changing the intensity of said upper and lower lamps substantially midway during the normal cooking time at the beginning of which the elevated temperature was determined thereby changing the energy provided to the given food by said upper and lower lamps by an amount substantially equivalent to the amount of energy provided to the given food by the oven secondary heating.

16. An oven for cooking food with radiant energy from at least one high power lamp with a significant portion of the radiant energy of the lamp in the visible and near visible light ranges of the electromagnetic spectrum, the apparatus comprising:

a. a cooking chamber having reflective inner walls and a location for positioning food to be cooked, b. at least one high power lamp for producing radiant energy to the food positioned on the food location, c. means for applying power to said one lamp for irradiating the food, d. means for determining an elevation temperature at a given location on said cooking chamber where oven secondary heating has a relation to the cooking time of food cooked in the oven, e. means for determining the reduction of the total lamps on time for a given recipe for cooking given food by a time amount related to the determined temperature elevation, and f. means for periodically reducing the power to said lamp for periods of reduced power time substantially midway during the normal cooking time at the beginning of which the elevated temperature was determined for said given recipe with a total time of the periods of reduced power producing a reduction of the energy provided to the portion of the given food by said one lamp substantially equivalent to the energy provided to said portion of the given food by the oven secondary heating.

17. The apparatus of claim 16 wherein said means for reducing the power to one said lamp includes means for turning the power off to said one lamp.

18. The apparatus of claim 16 wherein said means for reducing the power to said one lamp includes means for periodically lowering the power to said one lamp without turning off the power to said one lamp.

19. The apparatus of claim 18 wherein said means for periodically reducing the power to said one lamp includes means for reducing the power for a first period of time before the end of the cooking cycle and after said one lamp has been at full power for a second period of time.

20. The apparatus of claim 19 including means for reducing the power to said one lamp for substantially 4 seconds before the end of the cooking cycle and after said lamp has been at full power for substantially 3 seconds.

21. An oven for cooking food with radiant energy from a plurality of high power lamps with a significant portion of the radiant energy in the visible and near visible light ranges of the electromagnetic spectrum the apparatus comprising:

a. a cooking chamber having reflective inner walls and a location for positioning food to be cooked, b. at least one upper high powered lamp for providing radiant energy mainly downwardly toward food positioned on the food location, c. at least one lower high powered lamp for providing radiant energy mainly upwardly toward food positioned on the food location, d. means for applying power to said upper and lower lamps for irradiating the food, e. means for determining an elevation temperature at a given location on said cooking chamber where oven secondary heating has a relation to the cooking time of food cooked in the oven, f. means for determining the reduction of the total lamp on time for a given recipe for cooking given food by a time amount related to the determined temperature elevation, and g. means for periodically reducing the power to said upper and lower lamps for one or more periods of reduced power time substantially midway during the normal cooking time at the beginning of which the elevated temperature was determined for said given recipe with the total time of the periods of reduced power producing a reduction of the energy provided to the given food by said lamps by an amount substantially equivalent to the energy provided to the given food by the oven secondary heating.

22. The apparatus of claim 21 wherein said means for reducing the power to said lamps includes means for turning the power off to said lamps.

23. The apparatus of claim 21 wherein said means for reducing the power to said lamps includes means for periodically lowering the power to said lamps without turning off the power to said lamps.

24. The oven of claim 21 including means for evacuating at least a portion of the heated air from the cooking chamber to reduce the oven secondary heating.

25. The apparatus of claim 21 wherein the means for periodically reducing the power to said lamps includes means for reducing the power for a first period of time before the end of the cooking cycle and after said lamps have been at full power for a second period of time.

26. The apparatus of claim 25 including means for reducing the power to said lamps for substantially 4 seconds before the end of the cooking cycle and after said lamps have been at full power for substantially 3 seconds.

27. The apparatus of claim 21 including means for adjusting the periodically turned off times to be longer or shorter based upon the nature of the food being cooked.

28. The apparatus of claim 21 including means for establishing the periodic off time of said upper or lower lamp that is closer to the food being cooked with a time longer than the periodic off time of the other lamp.

29. An oven for cooking food with radiant energy from a plurality of high power lamps with a significant portion of the radiant energy in the visible and near visible light ranges of the electromagnetic spectrum the apparatus comprising:

a. a cooking chamber having reflective inner walls and a location for positioning food to be cooked, b. at least one upper high powered lamp for providing radiant energy mainly downwardly toward food positioned on the food location, c. at least one lower high powered lamp for providing radiant energy mainly upwardly toward food positioned on the food location, d. means for applying power to said upper and lower lamps for irradiating the food, e. means for determining an elevation temperature at a given location in said cooking chamber where oven secondary heating has a relation to the cooking time of food cooked in the oven, f. means for determining the reduction of the total lamp on time for a given recipe for cooking given food by a time amount related to the determined temperature oven secondary heating, and g. means for periodically changing the intensity of said upper and lower lamps substantially midway during the normal cooking time at the beginning of which the elevated temperature was determined for said given recipe thereby changing the energy provided to the given food by said upper and lower lamps by an amount substantially equivalent to the amount of energy provided to the given food by the oven secondary heating.

30. The apparatus of claim 29 wherein the means for periodically reducing the intensity of said lamps includes means for reducing the intensity for a first period of time before the end of the cooking cycle and after said lamps have been at full intensity for a second period of time.

31. The apparatus of claim 29 including means for adjusting the periodically reduced intensity to be longer or shorter based upon the nature of the food being cooked.

32. The apparatus of claim 29 including means for establishing the periodic reduced intensity of said upper or lower lamp that is closer to the food being cooked with a time longer than the periodic reduced intensity of the other lamp.

* * * * *